(12) United States Patent
Morley

(10) Patent No.: US 12,067,249 B2
(45) Date of Patent: Aug. 20, 2024

(54) DATA SHAPING TO REDUCE MEMORY WEAR IN A MULTI-TENANT DATABASE

(71) Applicant: Amazon Technologies, Inc., Seattle, WA (US)

(72) Inventor: Adam Douglas Morley, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 844 days.

(21) Appl. No.: 16/550,031

(22) Filed: Aug. 23, 2019

(65) Prior Publication Data

US 2019/0377501 A1    Dec. 12, 2019

Related U.S. Application Data

(63) Continuation of application No. 14/560,917, filed on Dec. 4, 2014, now Pat. No. 10,394,462.

(51) Int. Cl.
G06F 3/06    (2006.01)

(52) U.S. Cl.
CPC ............ *G06F 3/0616* (2013.01); *G06F 3/065* (2013.01); *G06F 3/0679* (2013.01); *G06F 2206/1014* (2013.01)

(58) Field of Classification Search
CPC ...... G06F 3/0616; G06F 3/065; G06F 3/0679; G06F 12/00; G06F 13/00
See application file for complete search history.

(56) References Cited

U.S. PATENT DOCUMENTS

| | | | |
|---|---|---|---|
| 5,341,339 A | 8/1994 | Wells | |
| 5,485,595 A | 1/1996 | Assar et al. | |
| 5,754,843 A * | 5/1998 | Imanaka | H04N 21/812 707/999.005 |
| 5,912,848 A | 6/1999 | Bothwell | |
| 5,937,409 A * | 8/1999 | Wetherbee | G06F 16/289 |
| 6,456,528 B1 | 9/2002 | Chen | |
| 7,711,744 B1 * | 5/2010 | Kashikar | G06F 16/2425 707/769 |
| 8,504,556 B1 * | 8/2013 | Rice | G06F 16/252 707/719 |
| 8,949,555 B1 * | 2/2015 | Karamcheti | G06F 13/364 711/158 |
| 9,047,214 B1 * | 6/2015 | Northcott | G06F 11/108 |
| 9,892,479 B1 * | 2/2018 | Pruitt | G06F 11/1004 |
| 10,067,968 B2 * | 9/2018 | Balasa Ramnath | G06F 16/2272 |

(Continued)

OTHER PUBLICATIONS

Jedrak, "NAND Flash memory in embedded systems," design-reuse.com, Jun. 13, 2013, 8 pages.

(Continued)

*Primary Examiner* — Tuan V Thai
(74) *Attorney, Agent, or Firm* — Davis Wright Tremaine LLP

(57) ABSTRACT

A multi-tenant database may maintain a plurality of datasets on a memory device that is subject to degraded operation caused by a subset of possible state transitions within the device's memory cells. A storage engine may identify entropy characteristics of datasets, independently of other datasets hosted on the memory, and use the entropy to construct a symbol table that maps from data within the dataset to symbols that may be stored on the memory device with a minimized number of state transitions.

18 Claims, 6 Drawing Sheets

(56) References Cited

U.S. PATENT DOCUMENTS

| | | |
|---|---|---|
| 2007/0266200 A1 | 11/2007 | Gorobets et al. |
| 2007/0288247 A1 | 12/2007 | Mackay |
| 2009/0043831 A1 | 2/2009 | Antonopoulos et al. |
| 2010/0250700 A1 | 9/2010 | O'Brien et al. |
| 2011/0238903 A1* | 9/2011 | Ban .................... G11C 16/3495 |
| | | 711/E12.008 |
| 2012/0240124 A1 | 9/2012 | Lipton et al. |
| 2012/0304262 A1 | 11/2012 | Cucco et al. |
| 2014/0059287 A1 | 2/2014 | Bains et al. |
| 2014/0089560 A1 | 3/2014 | Sunkavalli et al. |
| 2015/0205525 A1 | 7/2015 | Chiu et al. |
| 2015/0254560 A1 | 9/2015 | Laredo et al. |

OTHER PUBLICATIONS

Sharon et al., "Data Shaping for Improving Endurance and Reliability in Sub-20nm NAND," Flash Memory Summit, Aug. 4, 2014, 24 pages.

* cited by examiner

DATA SHAPING TO REDUCE MEMORY WEAR IN A MULTI-TENANT DATABASE

CROSS-REFERENCE TO RELATED APPLICATIONS

This application is a continuation of U.S. patent application Ser. No. 14/560,917, filed Dec. 4, 2014, entitled "DATA SHAPING TO REDUCE MEMORY WEAR IN A MULTI-TENANT DATABASE," the disclosure of which is hereby incorporated herein in its entirety.

BACKGROUND

Solid-state drives may have a variety of benefits, such as speed and reliability that may be improved over conventional mechanical disk drives. However, the operational lifetime of a solid-state drive may be limited by factors such as memory wear, in which repeated reprogramming of the contents of memory causes the operation of the device to be degraded over time. Although solid-state drives may include memory controllers that manage the effects of memory wear, such controllers operate at the level of the drive and are not well-adapted for use in a hosted services environment.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
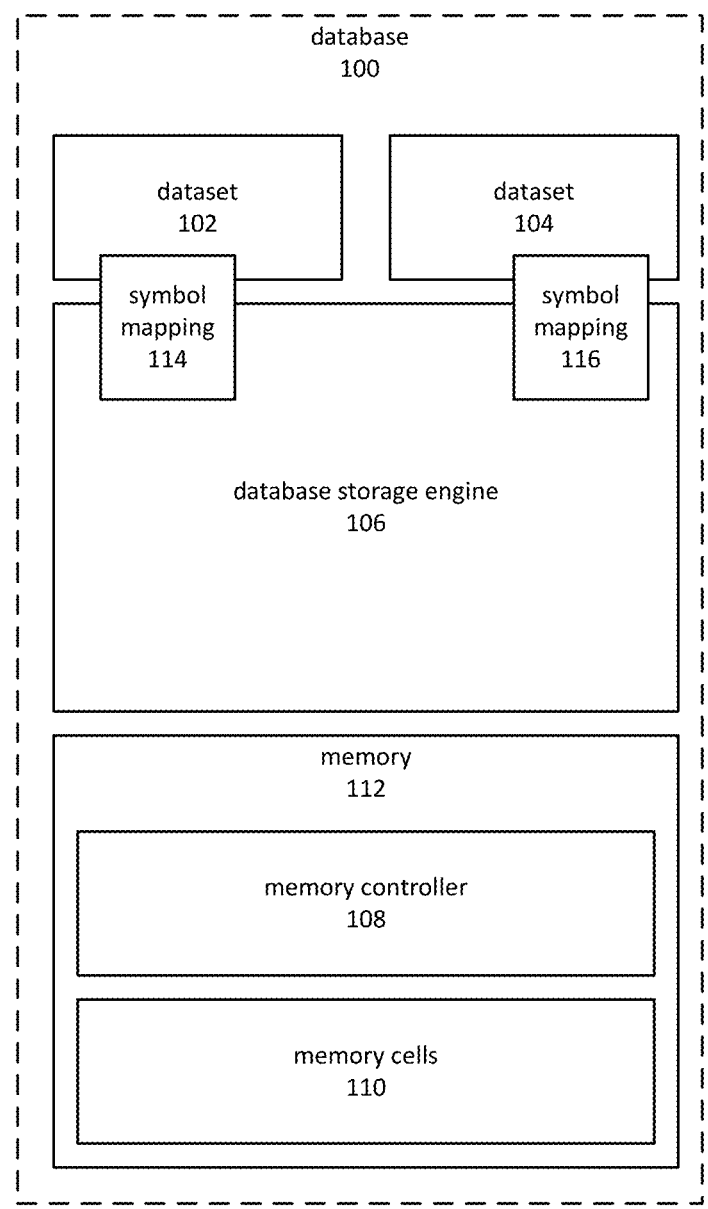
FIG. 1 is a block diagram depicting a multi-tenant database system that includes a memory device that may be subject to degraded operation upon state transitions in its memory cells.

Embodiments of the present disclosure may be employed in conjunction with the maintenance of a plurality of datasets on a plurality of memories, such as solid-state drives, that are subject to degraded performance caused by state transitions of memory cells contained in the memory.

Various types of memories, such as solid-state drives and flash drives, may be subject to degraded operation caused by state transitions in the memory cells of such devices. These devices may include various types of non-volatile memory, such as those with memory cells based on negated-and ("NAND") or negated-or ("NOR") techniques. Various other types of erasable-programmable memory cells may also possess characteristics related to operation that is degraded due to state transitions, such as repeated erase-program cycles. Memory devices such as solid-state devices may generally be referred to as being erasable-programmable memories, although the term "memory" as described herein is not limited to devices that undergo distinct erase-program cycles. Other examples of non-volatile memories include resistive memories and phase change memories. The term "memory" may include other types of storage. In addition, state transitions may include read operations that, while not changing the contents of the memory, nevertheless affect the state of the memory by causing wear. In some cases, read disturbance phenomena may require rewrites, which in turn may cause additional wear. It may be the case that, for some types of memory, read operations involving certain bit states may cause greater wear than read operations involving the opposite bit state. Accordingly, a read operation involving a first bit pattern might cause more wear than a read operation involving a second bit pattern.

Devices such as the foregoing may possess various limitations regarding the number of state transitions, such as erase-program cycles, read accesses, write accesses, and so forth, that a memory cell may be subject to before its operation is degraded. The degraded operation may cause a memory cell to fail or otherwise have degraded operation after some number of repeated erase-program cycles or other operations. A typically memory device, such as a solid-state drive, may contain large numbers of such cells. A memory controller for a solid-state drive may manage disabled or poorly performing cells. Over time, the operation of the solid-state drive may be noticeably affected as increasing numbers of its memory cells begin to fail or to perform poorly. The degraded operation caused by this process may be referred to as memory wear.

In some such devices, a subset of possible state transitions may result in degraded operation, while the remaining subset may not cause degraded operation. For example, it may be the case in some devices that erase operations will cause operation of the device to be degraded, while writes do not. Depending on the data being written, certain write operations may have a greater impact than others. For example, in some devices erasing the memory may correspond to setting a memory cell to contain the value zero, and doing so may cause degraded operation of the memory cell. Writing a value of one to the same cell, on the other hand, may not affect the operation of the memory cell. Accordingly, the effect of a data write on a memory may depend on factors such as the distribution of ones and zeros in the data to be written, and on the distribution of ones and zeros in the memory on which the data will be stored. Additional factors may also influence the effect, such as write amplification and similar effects.

Embodiments may maintain a plurality of datasets on a plurality of memories subject to degraded performance caused by state transitions. Although memory controllers may in some cases provide management of poorly operating memory cells, the operation of such controllers may typically be unaware of the operation of applications that utilize the storage provided by the device, generally through various operating system calls and other layers of indirection. Aspects of the present disclosure may be employed to manage degraded operation of these types of memories when a plurality of such devices is employed in conjunction with the maintenance of a plurality of datasets on the devices. One non-limiting example involves a distributed database system maintaining a plurality of datasets, as a service, on behalf of various customers. This type of distributed database may be referred to as a multi-tenant database. Multi-tenant databases may employ aspects of the present disclosure to manage the operational lifetime of memory devices associated with the service.

Database systems may identify various entropy attributes related to each dataset. A dataset may refer to a collection of related data, such as a collection of data corresponding to a single database tenant. Embodiments may identify entropy characteristics of a dataset, independently of other datasets hosted on a multi-tenant database system, and use the entropy of the dataset to form a symbol table that maps from subsets of the dataset to symbols that may be stored on a memory device with a minimized number of state transitions that cause memory wear.

FIG. 1 is a block diagram depicting a multi-tenant database system that includes a memory device that may be subject to degraded operation upon state transitions in its memory cells. It will be appreciated that FIG. 1 is intended to be illustrative of various aspects of the present disclosure as they apply to the interaction between such a memory device, or devices, and a database system. FIG. 1 should not be construed as limiting the scope of the present disclosure to a particular form of database. In particular, aspects of the present disclosure may be employed in conjunction with a variety of databases and similar applications for managing data in various computing systems. This may include relational, object-oriented, no structured query language ("NoSQL") databases, and so on. Both distributed and non-distributed database systems may be employed. Any of these various systems for managing data, as well as various additional types not explicitly described, may utilize the techniques described herein to improve interaction with memory devices that are subject to degraded operation caused by state transitions.

In FIG. 1, database 100 may comprise various subcomponents including database storage engine 106 coupled to memory 112. The memory 112 may be subject to degraded operation caused by state transitions in memory cells 110. A memory controller 108 may perform various operations to store and retrieve data. Operations performed by memory controller 108 to store data may comprise erasing and rewriting blocks of memory. As described herein, certain of these erase and write operations may cause operation of the memory cells 110, and accordingly of memory 112, to be degraded. Memory controller 108 may perform various operations to minimize performance degradation. In various cases, memory controller 108 may provide various statistical information indicating a rate at which the operation of memory cells 110 are being degraded by state transitions.

A database 100 may house various datasets, such as the depicted datasets 102 and 104. A dataset, such as datasets 102 or 104, may refer to a collection of data owned by, belonging to, or corresponding to a common entity, such as a customer of a hosted database service. A hosted database service may provide computing services for the storage, retrieval, and management of data, and may be accessible to a customer through a network, one example of which is the Internet. A dataset, such as datasets 102 or 104, may also be owned by, belong to, or correspond to other entities, such as an executable computer process. In addition, a dataset may also include other units of or groupings of data, such as database tables and so on. A dataset, therefore, may include one or more collections of data, including rows, tables, object graphs, n-dimensional cubes, and so on. In some cases, a dataset may refer to data sharing common schema definition, common semantic meaning, and/or common lexicography.

A database storage engine 106 may maintain datasets 102 and 104 by storing records indicative of the datasets in memory 112, or more specifically in memory cells 110. For simplicity, datasets 102 and 104 may be said to be maintained by database storage engine 106 in memory 112.

Maintaining a dataset, such as dataset 102, on memory 112 may comprise performing various storage and retrieval operations. Database storage engine 106 may interact, directly or indirectly, with memory 112 and memory controller 108 to store or retrieve data from memory cells 110.

Embodiments may utilize the operation of database storage engine 106 to reduce the impact of maintaining datasets 102 and 104 on the rate at which the operation of memory 112 is degraded by state transitions of memory cells 110.

Embodiments may utilize the operation of database storage engine 106 to collect information indicative of state transitions of memory cells 110 that may be caused in the course of maintaining datasets 102 and 104 on memory 112. Database storage engine 106 may collect information pertaining to write operations issued in the course of maintaining a specific dataset, such as dataset 102. These metrics may be collected independently of information pertaining to other datasets, such as dataset 104. The metrics may include information such as a count of write operations performed, a count of write operations corresponding to a specific pattern (such as all zeros or all ones), measures of entropy in the written data, a count of state transitions required to store the data, the locality of the data written, whether the writes occur continuously or in a burst pattern, and so on. These metrics may, individually or in combination, be indicative of the state transitions required to maintain the corresponding dataset.

A database storage engine 106 may obtain information about the operating characteristics of memory 112, including information indicating which state transitions of memory cells 110 may cause degraded operation. This may include an indication of which bit states may require an erase-program cycle, which may also be referred to as an erase-write cycle. For some memory types, such as NAND, encoding a value of '1' may require an erase-program cycle when the corresponding memory cell is set to zero. This may also apply to memory cells that span more than one bit of information, such as a cell that represents "1111." Embodiments may also obtain information indicating which bit state transitions do not require a full erase-program cycle, or otherwise do not cause degraded operation of the memory device. For example, bit patterns of "0" or "0000" may not require a state transition that degrades operation.

Embodiments may construct a mapping between portions of datasets and symbols that are selected to minimize the number of memory state transitions performed while maintaining a dataset on a storage device. For example, symbol mapping 114 may be associated with dataset 102 and symbol mapping 116 may be associated with dataset 104.

A symbol mapping, such as symbol mapping 114, may be based on the entropy associated with the dataset to which it corresponds. Entropy of a dataset may include data content of the dataset. This may include the data content of a dataset at any one point in time, as well as data content over time. Entropy of a dataset may therefore also include information such as write patterns associated with maintaining the dataset. This may include, for example, information indicative of fields, columns, attributes, and so on that change frequently.

Symbol mapping 114 may be based on the entropy of dataset 102, exclusive of entropy associated with dataset 104.

Database storage engine 106 may record various metrics indicative of the maintenance operations related to each dataset. The metrics may include those related to requests to store data on memory 112. A database storage engine 106 may monitor changes to fields, columns, and attributes in order to determine which of these changes the most frequently. For example, a specific value may be used as the value for a column of a table that frequently has new rows inserted into it. The storage engine may identify this value for representing with a symbol that may be stored in memory with a minimum of state transitions that would degrade operation of the memory. A database storage engine 106 may also collect information pertaining to write locality, the amount of data written, the granularity or block sizes involved in writing data, and so forth.

A symbol mapping, such as symbol mapping 114, may be constructed by identifying symbols that are less likely or are guaranteed to not require memory state transitions that degrade operation of the memory device. Frequently changed data may be represented by the most optimal symbols, i.e., those least likely to require a memory state transition that degrades operation of the memory device. Other forms of entropy in the dataset may also be utilized. A symbol mapping, such as symbol mapping 114, may be determined using entropy of a corresponding dataset 102, and independently of other datasets, such as dataset 104. As a result, the symbol table may be more effective at reducing state transitions than techniques that disregard dataset boundaries.

In an embodiment, a multi-tenant database management system may maintain an association between a tenant of the database and a particular mapping. It may be the case that for a given customer, process, or other entity (i.e. a tenant), certain data characteristics and patterns may tend to exist between datasets. In such cases, a new dataset may utilize a pre-existing symbol mapping as a first estimate of the entropy in the new dataset.

In some cases and embodiments, an existing dataset may be relocated to a different database management system, or to a different partition within the same database management system. A symbol table corresponding to a dataset may be transmitted from a first set of computing nodes currently maintaining the dataset to a second set of computing nodes that will subsequently maintain the dataset. The symbol table from the original location may act as a first estimate of a symbol mapping table at the new location.

In some cases and embodiments, a corpus of existing data, corresponding to a dataset, may be scanned prior to storing a dataset and used to form a symbol table. Embodiments may support such an initial scan for various reasons, for example to avoid potential subsequent disruptions to the operation of the database.

Figure 2:
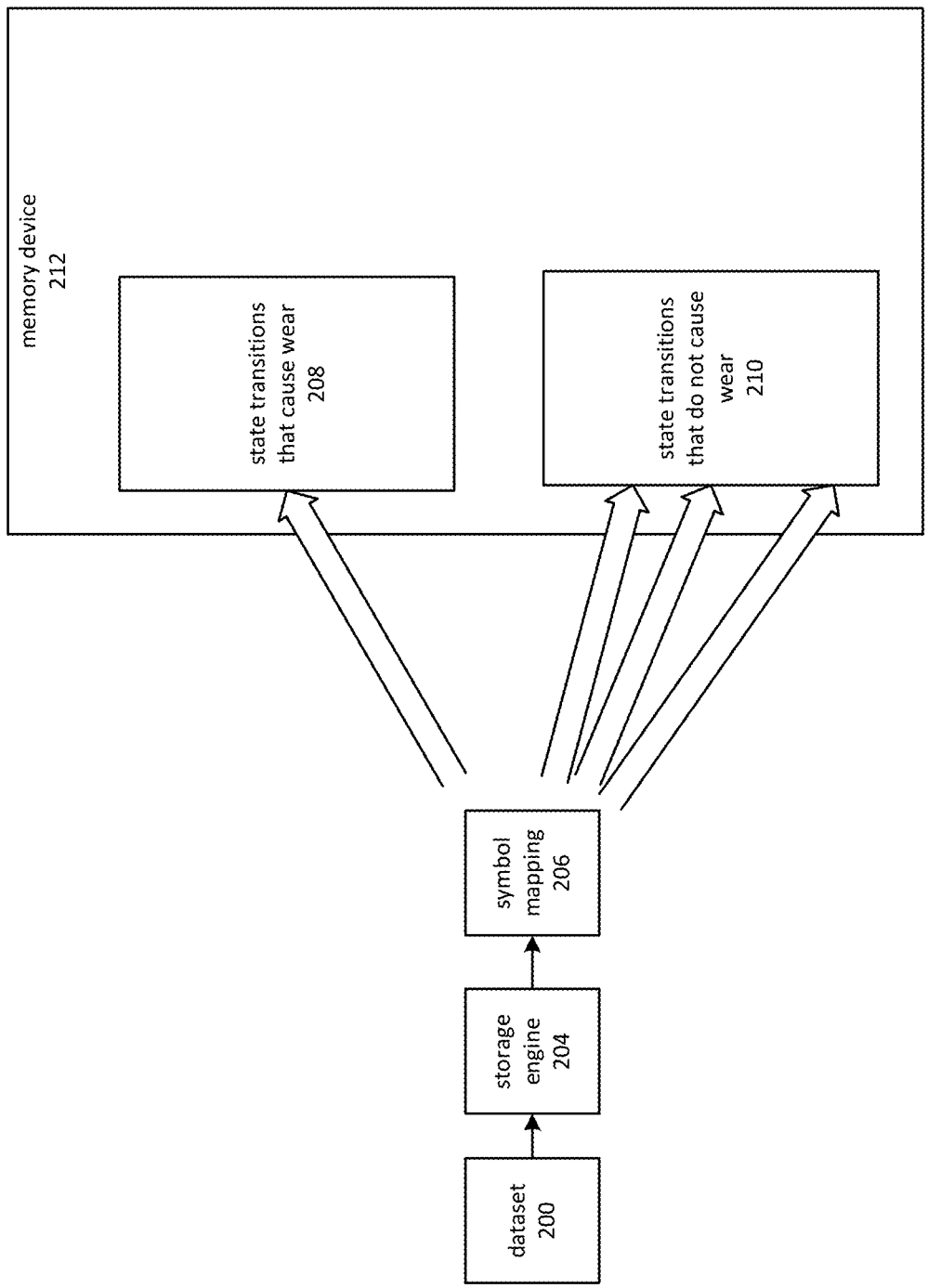
FIG. 2 is a block diagram depicting an optimization-based process for constructing a symbol table for storing a dataset on a memory subject to wear caused by a subset of possible state transitions.

FIG. 2 is a block diagram depicting an optimization-based process for constructing a symbol table for storing a dataset on a memory subject to wear caused by a subset of possible state transitions.

A storage engine 204 may perform operations related to the maintenance of a dataset 200 on a memory device 212. Maintenance may include transmitting requests to store or retrieve data on memory device 212, including storing data that is representative of dataset 200. In order to store data representative of dataset 200, storage engine 204 may construct a symbol mapping 206. A symbol mapping 206 may include associations between subsets of dataset 200 and a symbol (not shown) that may be stored on memory device 212.

A symbol may refer to a bit pattern that corresponds to a subset of data within dataset 200. For example, a value in dataset 200 might be "10101010." A corresponding symbol might be "00." Depending on various factors including the nature of dataset 200, different values, sequences, or other patterns of dataset 200 might be represented by a symbol. Note that, in contrast to compression techniques, embodiments may select longer patterns over shorter patterns, when the longer pattern involves fewer state changes that degrade operation of a memory.

A symbol mapping 206 may be formed to correspond to dataset 200. In various embodiments, symbol mapping 206 may be formed using a minimization-maximization process in which a minimum number of symbols correspond to state transitions that cause wear 208 and a maximum number of symbols correspond to state transitions that do not cause wear 210.

Embodiments may utilize access to metadata corresponding to dataset 200 in order to improve symbol mapping 206. For example, embodiments might assign a unique symbol to each value that appears in a column or assign symbols to commonly recurring rows. Symbols might also be mapped to values on a per-table basis. In that case, a symbol unlikely to involve a wear-causing state transition might be reused to represent the most commonly recurring value in each table. A storage engine 204 may utilize the context of the data it is storing and retrieving to distinguish between the reused symbols.

Figure 3:
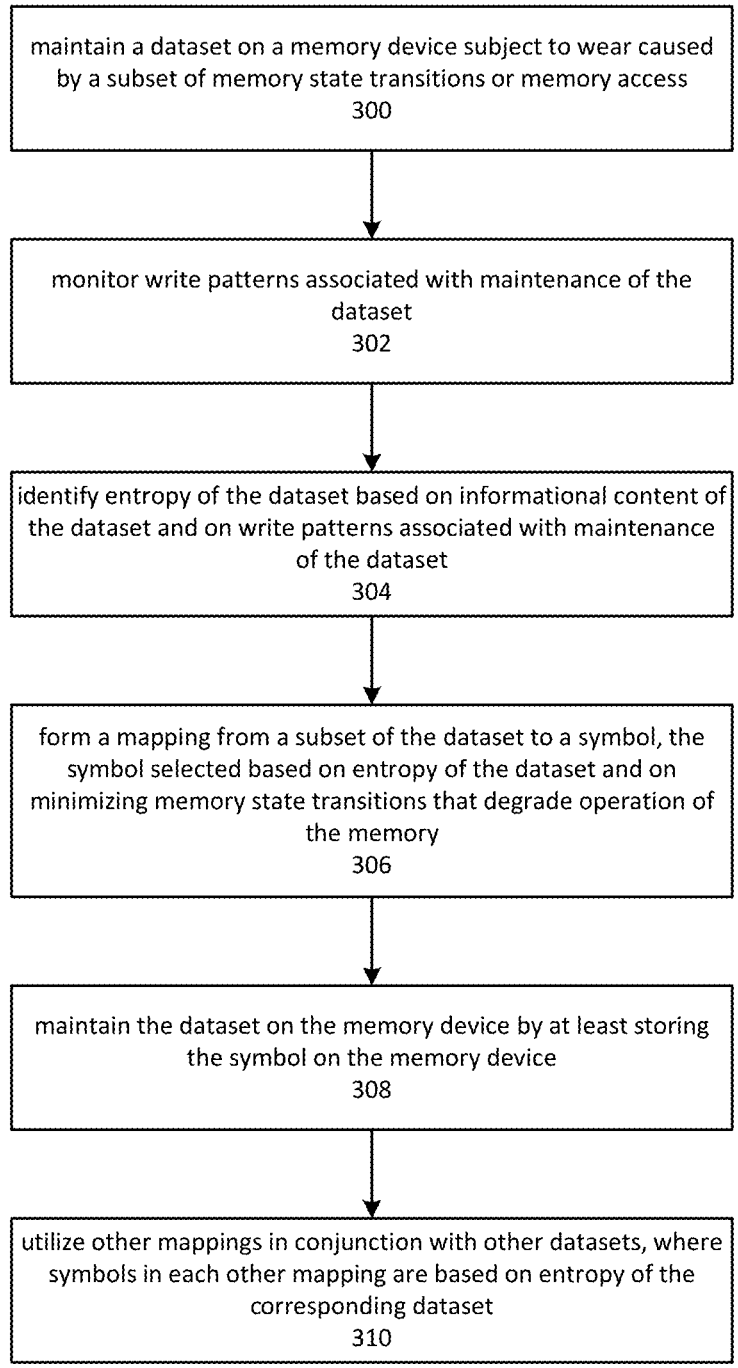
FIG. 3 is a flowchart depicting an embodiment of a process for constructing and utilizing a symbol table to maintain a plurality of datasets on a memory subject to wear caused by state transitions.

FIG. 3 is a flowchart depicting an embodiment of a process for constructing and utilizing a symbol table to maintain a plurality of datasets on a memory subject to wear caused by state transitions. Although depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using various combinations of computer-executable instructions executed by a computing system, such as the computing systems described herein.

Operation 300 depicts an embodiment maintaining a dataset on a memory device that is subject to wear caused by a subset of the possible state transitions of its corresponding memory cells. Maintenance of the dataset may be associated with additional operations, such as operations 302 and 304 as depicted in FIG. 3.

Operation 302 involves an embodiment monitoring write patterns associated with maintenance of the dataset. This may include identifying columns, fields, or attributes that are written with relatively high frequency. It may also involve identifying locality of writes, which may involve determining which columns, fields, or attributes are rewritten most frequently, such that previously programmed memory cells must be rewritten. Write patterns over time may also be monitored, and said patterns used to determine whether certain write patterns are likely to continue into the future.

Operation 304 involves an embodiment identifying entropy of the dataset. The entropy may be identified based on the informational content of the dataset. Embodiments may also incorporate information pertaining to write patterns, as referred to in the description of operation 302.

As depicted by operation 306, embodiments may form a mapping from a subset of the dataset to a symbol. The subset may, for example, comprise a value, field, or attribute of the dataset. In some embodiments, subsets such as rows, tables, data segments, and so forth may be mapped to a symbol. A symbol may be selected so that, when considered in conjunction with other mappings for the same dataset, the number of symbols whose storage causes memory wear is minimized and the number of symbols whose storage does not cause memory wear is maximized. Additionally, for those symbols that cause memory wear, the amount of memory wear may be minimized. For example, if storing a "1" may require an erase-program cycle that degrades operation of a memory device, a symbol may be formed in a way that minimizes the number of "1" values used in the symbol. Embodiments may also place the "1" values used in a symbol in a way that minimizes the number of erase-program cycles. For example, given an erase block size of 4 bits, a symbol of "1111 0000" might be selected over a symbol such as "1100 1100."

In some cases, the process of selecting a symbol may result in a net expansion, rather than compression of the data. Embodiments may incorporate the effect of writing additional data on the wear rate of the memory device, and balance that effect against the minimization of state transitions. Symbol selection may therefore, in some cases and embodiments, be based partly on the degree of compression or expansion resulting from the mapping.

As depicted by operation 308, embodiments may store the dataset, or more precisely a representation of the dataset, on the memory device by utilizing the symbols. This process may involve identifying a subset of the dataset, using a mapping that corresponds to the subset to identify a symbol, and writing that symbol to the memory device. This process may be repeated to store the dataset in its entirety. In some embodiments, only a portion of the dataset may be stored in this manner. For example, an embodiment might store structural data without utilizing the mapped symbols, but store the content of the dataset itself using the symbols.

Additional datasets may be stored using a similar process. As depicted by operation 310, embodiments may utilize other mappings in conjunction with other datasets, where the symbols used in each mapping are based on the entropy of the corresponding dataset.

Figure 4:
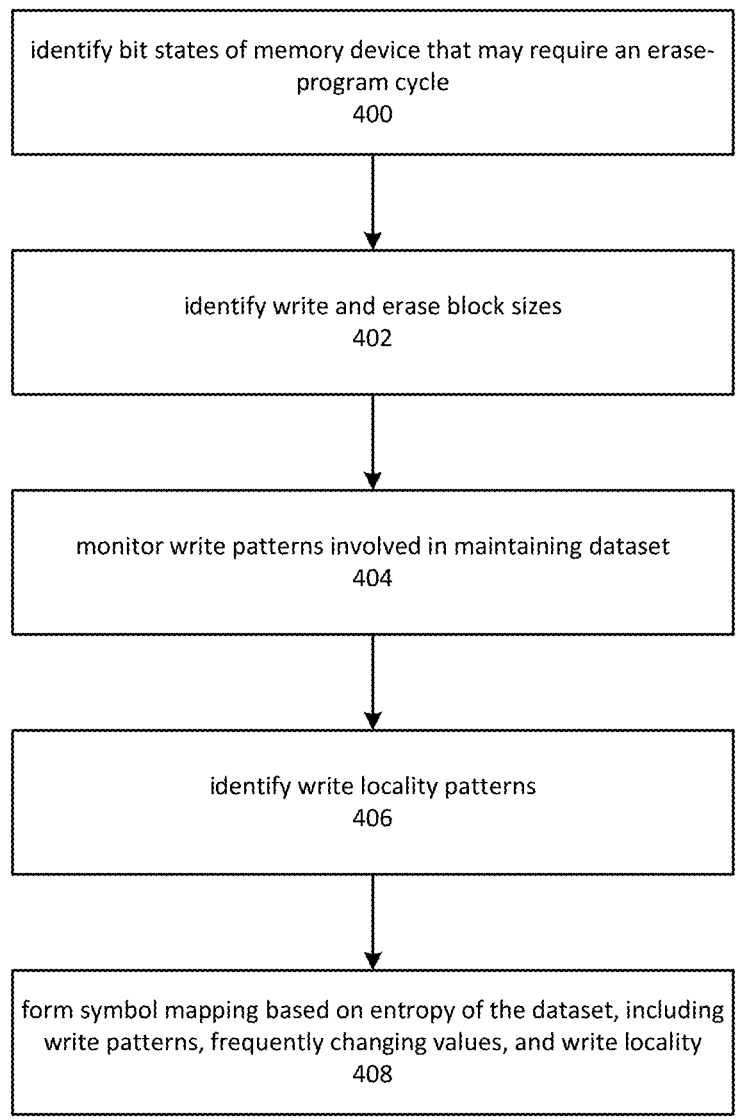
FIG. 4 is a flowchart depicting an embodiment of a process for forming a symbol mapping that reduces state transitions that cause memory wear associated with the maintenance of a dataset.

FIG. 4 is a flowchart depicting an embodiment of a process for forming a symbol mapping that reduces state transitions that cause memory wear associated with the maintenance of a dataset. Although depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using various combinations of computer-executable instructions executed by a computing system, such as the computing systems described herein.

Operation 400 depicts identifying the bit states of a memory device that may require an erase-program cycle. More generally, operation 400 may comprise identifying bit states that are associated with transitions that may cause operation of the memory to be degraded. This may comprise receiving information indicative of the type or category of memory device that is in use, and mapping that information to a bit state. The bit state may refer to values associated with an erase-program cycle that degrades operation of the memory. For example, in some cases storing a value of "1" may cause operation of the memory to be degraded, while setting a value of "0" may not.

Operation 402 depicts identifying write and erase block sizes for the device. Some memory devices may erase blocks of memory of one size, while writing memory in blocks of another size. Embodiments may identify erase and write block sizes in order to construct symbols that are properly aligned. For example, symbols may be selected based on their alignment with erase block sizes.

Operation 404 depicts monitoring write patterns involved in maintaining a dataset. This may comprise identifying columns, fields, attributes, and/or values associated with frequent write operations. Embodiments may select symbols so that the most frequently written data is expressed as the most transition-efficient symbol, meaning that the symbol used is likely to cause a minimum number of state transitions that degrade operation of the corresponding memory. Similarly, the least-frequently written values may be expressed less efficiently.

An embodiment may comprise identifying a subset of a dataset that is subject to a greatest amount of change as compared to other subsets of the dataset, and representing the subset with a symbol that, when stored on a memory device, causes a minimized number of state transitions in the subset of state transitions, as compared to other symbols included in the mapping.

In some cases and embodiments, per-column analysis of data in a dataset may be employed. The term per-column analysis may refer to analysis performed on logical groupings of related data. For example, in a key-value database, a column may refer to a collection of values indexed by a common key—for example "state," "country," or "phone number." Per-column analysis may also refer to a column in a relational table. The analysis may relate to the recurrence of particular data fields within the column.

Operation 406 depicts an embodiment identifying write locality patterns. In some cases, certain regions of a memory may be subject to a greater number of writes than other regions. Some embodiments may identify hotspots subject to frequent writes and use symbols that are less likely to involve state transitions that result in wear. The symbols selected for storing in the hotspot may emphasize reduction in wear-causing state transitions, as compared to symbols used in non-hotspot regions.

Operation 408 depicts forming a symbol mapping based on entropy of the dataset, including factors such as write patterns, frequently changing columns, fields, values, or attributes, and write locality. Embodiments may use various combinations of these factors. In some cases, a symbol mapping may be constructed based on entropy analysis of values occurring in the dataset, independent of the aforementioned factors.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages, such as SQL, while others use application programming interfaces ("APIs") containing operations, such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices, such as solid-state drives. As used herein, storing data may refer to performing any of various types of operations that involve writing data, such as adding, inserting, changing, and deleting data. The terms "update" and "updating" data may also be viewed as being synonymous with storing data.

Figure 5:
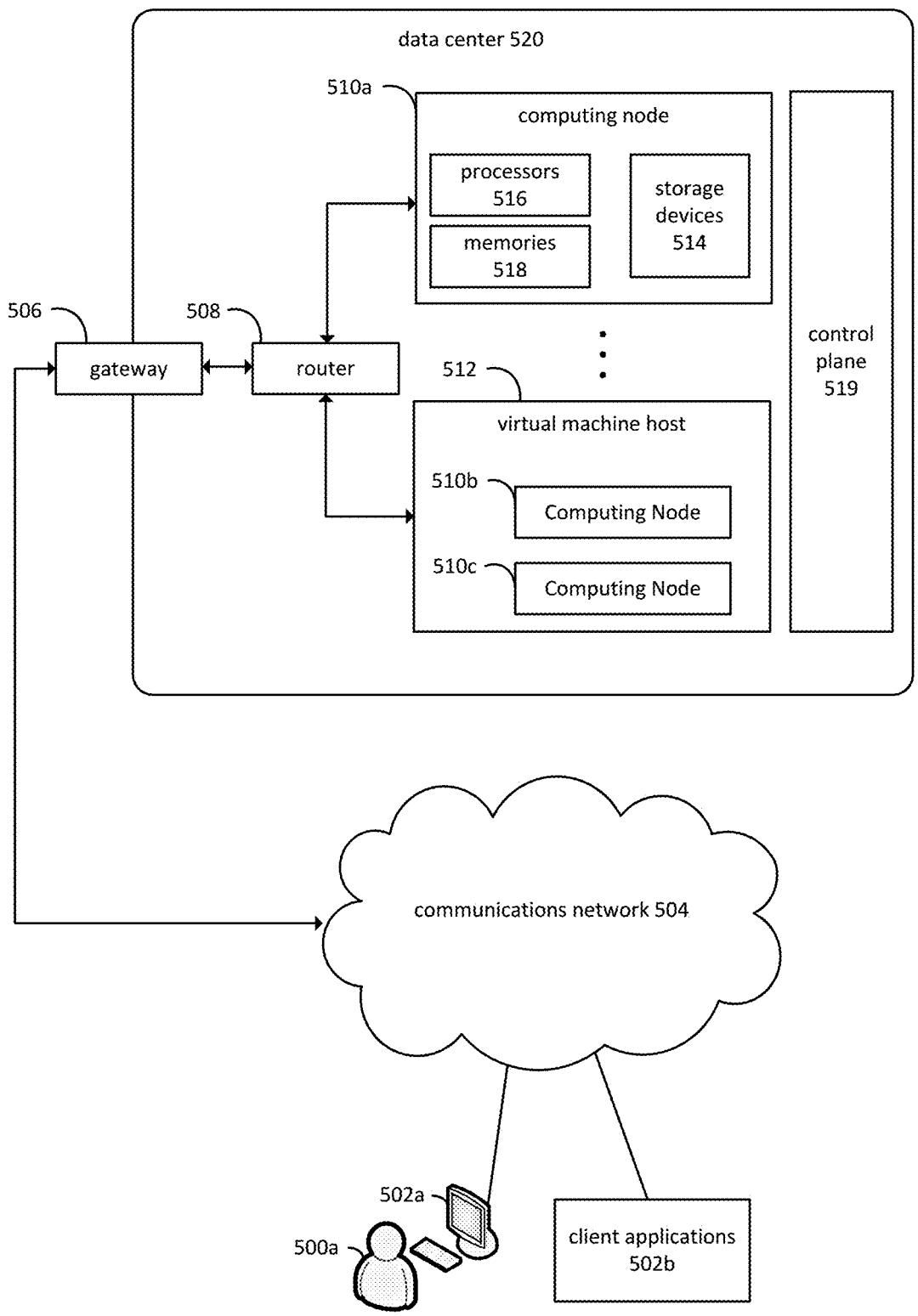
FIG. 5 is a block diagram depicting an embodiment of a computing environment in which aspects of the present disclosure may be practiced.

FIG. 5 is a diagram depicting an example of a distributed computing environment on which aspects of the present invention may be practiced. Various users 500a may interact with various client applications, operating on any type of computing device 502a, to communicate over communications network 504 with processes executing on various computing nodes 510a, 510b, and 510c within a data center 520. Alternatively, client applications 502b may communicate without user intervention. Communications network 504 may comprise any combination of communications technology, including the Internet, wired and wireless local area networks, fiber optic networks, satellite communications, and so forth. Any number of networking protocols may be employed.

Communication with processes executing on the computing nodes 510a, 510b, and 510c, operating within data center 520, may be provided via gateway 506 and router 508. Numerous other network configurations may also be employed. Although not explicitly depicted in FIG. 5, various authentication mechanisms, web service layers, business objects, or other intermediate layers may be provided to mediate communication with the processes executing on computing nodes 510a, 510b, and 510c. Some of these intermediate layers may themselves comprise processes executing on one or more of the computing nodes. Computing nodes 510a, 510b, and 510c, and processes executing thereon, may also communicate with each other via router 508. Alternatively, separate communication paths may be employed. In some embodiments, data center 520 may be configured to communicate with additional data centers, such that the computing nodes and processes executing thereon may communicate with computing nodes and processes operating within other data centers.

Computing node 510a is depicted as residing on physical hardware comprising one or more processors 516, one or more memories 518, and one or more storage devices 514. Processes on computing node 510a may execute in conjunction with an operating system or alternatively may execute as a bare-metal process that directly interacts with physical resources, such as processors 516, memories 518, or storage devices 514.

Computing nodes 510b and 510c are depicted as operating on virtual machine host 512, which may provide shared access to various physical resources, such as physical processors, memory, and storage devices. Any number of virtualization mechanisms might be employed to host the computing nodes.

A control plane 519 may comprise a computing node configured to coordinate or manage operations of other computing resources in data center 520, such as computing nodes 510a, 510b, and 510c, as well as virtual machine host 512. A control plane 519 may also manage aspects of the configuration and operation of gateway 506 and router 508, as well as various other network components not explicitly depicted in FIG. 5. Embodiments may include a management interface in control plane 519 for managing control functions, such as creating new instances of a computing node, such as computing nodes 510a, 510b, or 510c, adding or configuring a virtual machine host 612, configuring network configuration of router 508, and so on. Embodiments of a control plane 519 may also comprise mechanisms for configuring services or controlling operation of services within data center 520.

The various computing nodes depicted in FIG. 5 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 6:
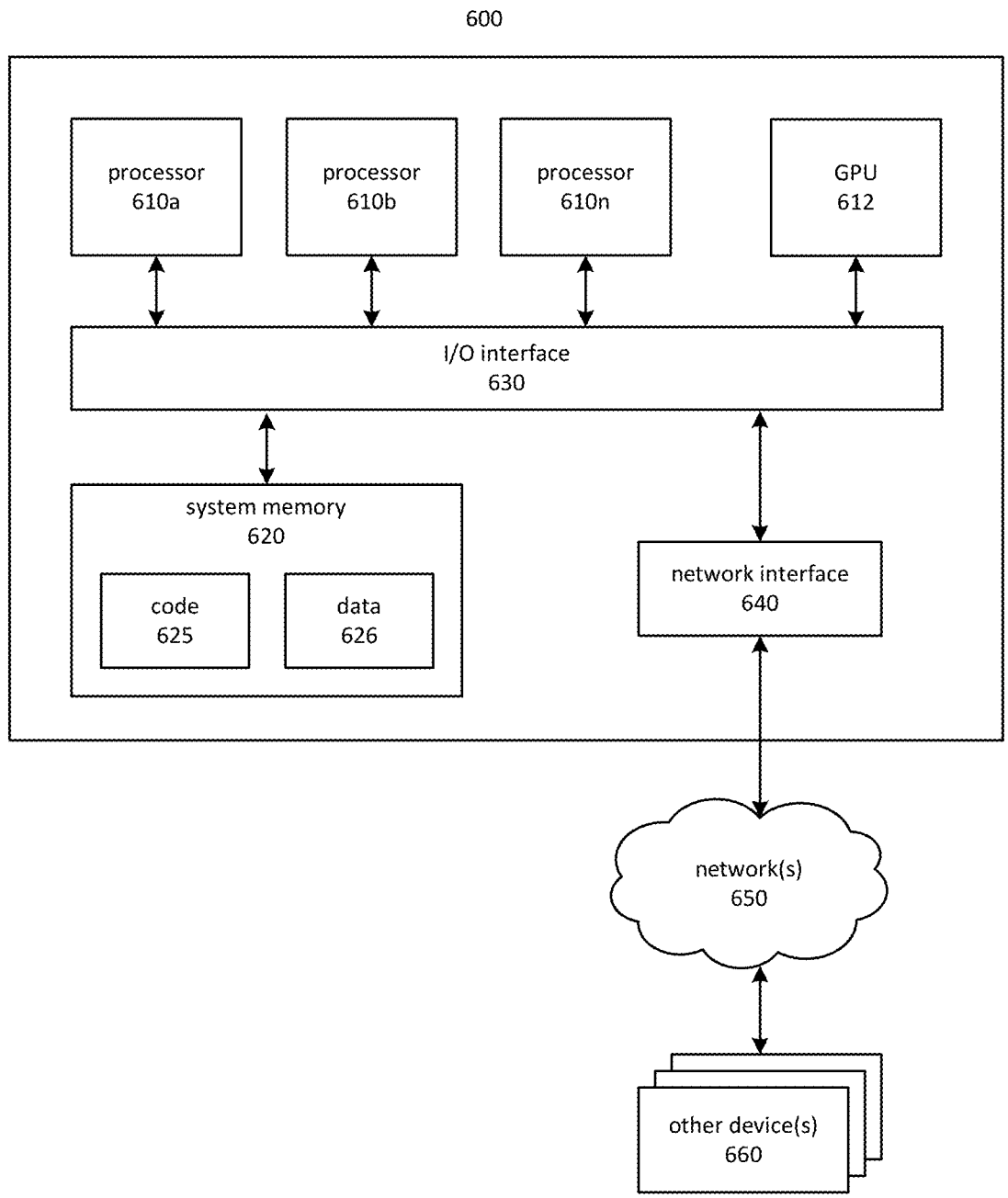
FIG. 6 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 6 depicts a general-purpose computer system that includes or is configured to access one or more computer-accessible media. In the illustrated embodiment, computing device 600 includes one or more processors 610a, 610b, and/or 610n (which may be referred herein singularly as a processor 610 or in the plural as the processors 610) coupled to a system memory 620 via an input/output ("I/O") interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures ("ISAs"), such as the x86, PowerPC, SPARC, or MIPS ISAs or any other suitable ISA. In multiprocessor systems, each of processors 610 may commonly, but not necessarily, implement the same ISA.

In some embodiments, a graphics processing unit ("GPU") 612 may participate in providing graphics rendering and/or physics processing capabilities. A GPU may, for example, comprise a highly parallelized processor architecture specialized for graphical computations. In some embodiments, processors 610 and GPU 612 may be implemented as one or more of the same type of device.

System memory 620 may be configured to store instructions and data accessible by processor(s) 610. In various embodiments, system memory 620 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 620 as code 625 and data 626.

In one embodiment, I/O interface 630 may be configured to coordinate I/O traffic between processor 610, system memory 620, and any peripherals in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computing device 600 and other device or devices 660 attached to a network or networks 650, such as other computer systems or devices, for example. In various embodiments, network interface 640 may support communication via any suitable wired or wireless general data networks, such as types of Ethernet networks, for example. Additionally, network interface 640 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 620 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 600 as system memory 620 or another type of memory. Further, a computer-accessible medium may include transmission media or signals, such as electrical, electromagnetic or digital signals, conveyed via a communication medium, such as a network and/or a wireless link, such as those that may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of network-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of central processing units ("CPUs"), the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages—such as Ruby, Perl, Python, C, C++, and the like—or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
    at least one processor; and
    at least one memory comprising instructions that, in response to execution by the at least one processor, cause the system to at least:
        analyze a frequency of one or more database operations performed on one or more portions of a database table, the one or more portions comprising at least one of a field, column, or attribute of the database table;
        map a portion of the one or more portions of the database table to a symbol selected to represent the portion of the database table on a memory device, the symbol selected, based at least in part on the analysis of the frequency of the one or more database operations, to minimize degrading the memory device, and the symbol selected independently of other one or more database tables; and
        store the symbol on the memory device to represent the one or more portions of the database table.

2. The system of claim 1, wherein the one or more database operations comprise writes to at least one of a column or row of the database table.

3. The system of claim 1, wherein the at least one memory comprises further instructions that, in response to execution by the at least one processor, cause the system to at least:
    access metadata associated with the database table; and
    form the mapping based at least in part on the metadata.

4. The system of claim 1, wherein the at least one memory comprises further instructions that, in response to execution by the at least one processor, cause the system to at least:
    obtain, from a database storage engine, information indicative of memory state transitions associated with maintaining the database table.

5. The system of claim 1, wherein the at least one memory comprises further instructions that, in response to execution by the at least one processor, cause the system to at least:
    store data for a portion of an additional database table, the data stored based at least in part on an additional mapping between the portion of the additional database table and symbols selected, based at least in part on the analysis of the frequency of the one or more database operations on the additional database table, to minimize degrading the memory device.

6. A computer-implemented method, comprising:
    mapping a portion of a database table to a symbol selected to represent the portion of the database table on a memory device, the symbol selected, based at least in part on information associated with database operations performed on at least one of a field, column, or attribute associated with the portion of the database table, to minimize degrading the memory device, and the symbol selected independently of another database table; and
    storing the symbol on the memory device.

7. The computer-implemented method of claim 6, further comprising:
    analyzing frequency of write operations on at least one of a column, field, or attribute of the database table.

8. The computer-implemented method of claim 6, further comprising:
    forming the mapping based at least in part on metadata associated with the database table.

9. The computer-implemented method of claim 6, further comprising:
    obtaining, from a database storage engine, information indicative of memory state transitions associated with maintaining the database table.

10. The computer-implemented method of claim 9, wherein the information is associated with a specific table.

11. The computer-implemented method of claim 6, wherein the operations comprise storing and retrieving data from the database table.

12. The computer-implemented method of claim 6, further comprising:
    forming the mapping based at least in part on a scan of data stored in the database table.

13. A non-transitory computer-readable storage medium, comprising instructions that, upon execution by at least one processor of a computing device, cause the computing device to at least:
    analyze a frequency of database operations performed on a database table on a memory device;
    map a portion of the database table to a symbol selected to represent the portion of the database table, the symbol selected, based at least in part the frequency of the database operations, to minimize degrading the memory device, and the symbol selected independently of another database table; and
    store the symbol on the memory device.

14. The non-transitory computer-readable storage medium of claim 13, wherein analyzing the frequency comprises analyzing write operations to at least one of a column, field, or attribute.

15. The non-transitory computer-readable storage medium of claim 13, comprising further instructions that, upon execution by at least one processor of a computing device, cause the computing device to at least:
    obtain, from a database storage engine, information indicative of memory state transitions associated with maintaining the database table.

16. The non-transitory computer-readable storage medium of claim 13, wherein the database operations comprise operations to store and retrieve data from the database table.

17. The non-transitory computer-readable storage medium of claim 13, wherein the mapping is associated with the database table, and wherein an additional mapping is associated with an additional database table, the mapping and the additional mapping determined independently.

18. The non-transitory computer-readable storage medium of claim 13, comprising further instructions that, upon execution by at least one processor of a computing device, cause the computing device to at least:
    form the mapping based at least in part on a scan of data stored in the database table.

* * * * *